A. L. PUTNAM.
DEMOUNTABLE DISK WHEEL.
APPLICATION FILED JULY 3, 1919.
1,384,405.
Patented July 12, 1921.
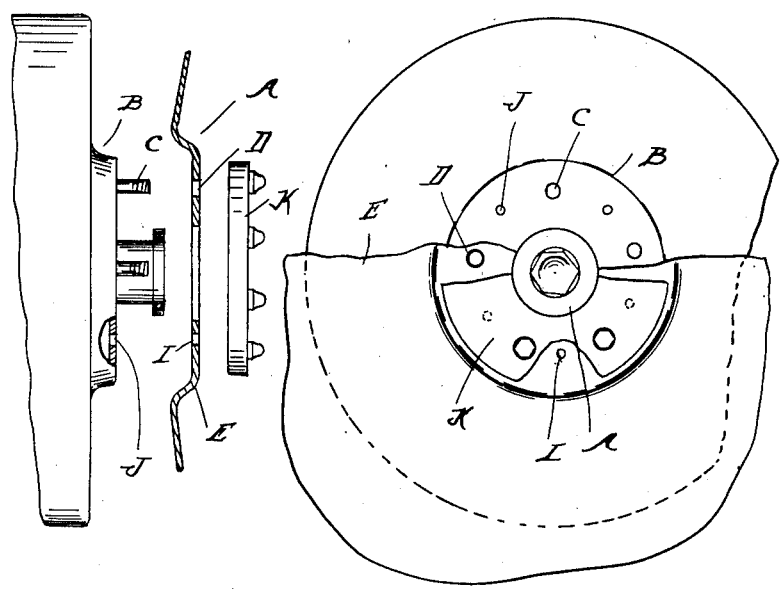
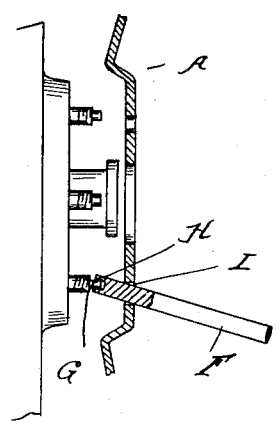
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

DEMOUNTABLE DISK WHEEL.

1,384,405.  Specification of Letters Patent.  Patented July 12, 1921.

Application filed July 3, 1919. Serial No. 308,599.

*To all whom it may concern:*

Be it known that I, ALDEN L. PUTNAM, a citizen of the United States of America, residing at Detroit, in the county of Wayne and State of Michigan, have invented certain new and useful Improvements in Demountable Disk Wheels, of which the following is a specification, reference being had therein to the accompanying drawing.

The invention relates to demountable disk wheels and has more particular reference to a construction which facilitates the mounting of the wheel upon the hub. A further feature of the invention is the combination with the wheel of a coöperating tool engageable therewith as hereinafter set forth.

In the drawings:

Figure 1 is a side elevation partly in section showing the parts detached.

Fig. 2 is a front elevation partly broken away.

Fig. 3 is a modified construction.

To mount a disk wheel upon the hub it is necessary to lift the disk with the rim and tire carried thereby. The type of demountable wheel to which my invention is applied is a disk wheel which is mounted upon a hub and secured thereto by clamping bolts or equivalent fastening devices. In mounting the wheel it is necessary first to lift the weight of the disk together with the rim and tire; and second, to register apertures in the disk with the corresponding apertures in the hub through which the bolts or fastening devices are inserted. Where the wheels are provided with large and heavy tires, it is a difficult matter for the operator to lift the weight without the aid of leverage. I have, however, provided a simple construction of tool which in operation with the wheel renders the mounting an easy matter.

In detail, A is the hub which is provided with a radially outwardly-extending flange B having studs C projecting forward therefrom and adapted to engage registering apertures D in the disk E. F is a mounting tool in the form of a bar which is insertible through an aperture in the disk E and is engageable with a fulcrum bearing on the hub so that it may be operated as a lever to lift the wheel. As shown in Fig. 3, the tool F is inserted through one of the apertures D of the disk and is engaged with the end portion of one of the studs or bolts C, which latter is provided with a reduced end portion G engageable with a socket H at the end of the tool. I prefer, however, to pass the tool through a separate aperture I in the disk and a registering aperture J in the hub flange, as shown in Fig. 3. With the latter construction any bar which is sufficiently small in diameter to pass through the apertures I and J can be used as a mounting tool.

When the wheel is being mounted, the axle is raised by a jack or other means, and the hub is free to revolve. It is, therefore, desirable to obtain a fulcrum bearing on the portion of the hub which is below its center so that it will not revolve when the weight of the wheel is placed thereon. For convenience I preferably form the disk with a series of apertures I arranged intermediate the apertures D and a corresponding series of apertures J upon the hub flange. This will permit of securing a fulcrum bearing on the lower part of the hub without regard to the exact rotative position thereof. The presence of the additional apertures I in the disk is not detrimental inasmuch as the clamping flange K, which is outside of the disk upon the hub, will conceal these apertures.

In use, where a disk wheel is to be mounted, the operator rolls the wheel in a position opposite the axle. He then inserts the rod F through the lowermost of the apertures I and into the corresponding aperture J. He then lifts the outer end of the rod inclining it slightly upward and with his other hand can guide the wheel so as to register and engage the apertures D to the bolt C.

What I claim as my invention is:

1. The combination with a hub, of a demountable disk wheel for engagement with said hub, said wheel having an aperture in the disk thereof, engageable by a tool for lifting the wheel into proper registration with the hub, and the hub having a bearing, providing a fulcrum for such a tool.

2. The combination with a hub, of a demountable disk wheel for engagement with said hub, said wheel having an aperture in the disk thereof, engageable by a tool for lifting the wheel into proper registration with the hub, and the hub having a bearing, substantially registering with said aperture, in the assembled relation of hub and wheel, providing a bearing for such a tool.

3. The combination with a hub, of a demountable disk wheel for engagement with said hub, and means applicable in a definite registering relation of said disk and hub to secure one to the other, the disk having an aperture therein for engagement by a leverage applying tool, and the hub being formed with a fulcrum bearing for said tool, said aperture and bearing being registrable in said definite registering relation of disk and hub whereby the application of a tool to said aperture and fulcrum bearing to register the same serves to establish the proper position of assembly for the wheel and hub.

4. The combination with a hub, of a demountable disk wheel for engagement with said hub, and a series of securing members upon the hub engageable with registrable apertures in the disk, the disk and hub being further formed with a series of apertures alternating with the first-mentioned apertures, whereby a tool may be inserted through any of said apertures in the disk and fulcrumed in one of said apertures of the hub to raise the wheel and establish the apertures thereof in registration with the securing members on the hub.

In testimony whereof I affix my signature.

ALDEN L. PUTNAM.